United States Patent
Soldo

(10) Patent No.: US 8,375,883 B2
(45) Date of Patent: Feb. 19, 2013

(54) ROTARY SWITCH AND RELATIVE ASSEMBLY METHOD

(75) Inventor: Giovanni Soldo, Brescia (IT)

(73) Assignee: Soldo S.r.l. Socio Unico, Desenzano del Garda, Brescia (IT)

( * ) Notice: Subject to any disclaimer, the term of this patent is extended or adjusted under 35 U.S.C. 154(b) by 469 days.

(21) Appl. No.: 12/747,246

(22) PCT Filed: Dec. 12, 2007

(86) PCT No.: PCT/IT2007/000866
§ 371 (c)(1),
(2), (4) Date: Jun. 10, 2010

(87) PCT Pub. No.: WO2009/075000
PCT Pub. Date: Jun. 18, 2009

(65) Prior Publication Data
US 2010/0258412 A1   Oct. 14, 2010

(51) Int. Cl.
*F16K 37/00* (2006.01)
*H01H 9/02* (2006.01)
*H01H 19/02* (2006.01)
(52) U.S. Cl. .................. 116/277; 116/DIG. 21
(58) Field of Classification Search .................. 116/227, 116/284, DIG. 21; 137/553, 554, 556, 556.3; 340/672; 200/11 R
See application file for complete search history.

(56) References Cited

U.S. PATENT DOCUMENTS

| | | | | |
|---|---|---|---|---|
| 5,223,822 A * | 6/1993 | Stommes et al. | ............. | 137/551 |
| 5,278,530 A * | 1/1994 | Zovath | ............. | 335/17 |
| 5,623,963 A * | 4/1997 | Stommes et al. | ............. | 137/554 |
| 5,647,396 A * | 7/1997 | Stommes et al. | ............. | 137/554 |
| 6,044,791 A * | 4/2000 | LaMarca et al. | ............. | 116/277 |
| 6,185,828 B1 * | 2/2001 | Schmidt | ............. | 33/1 PT |
| 6,820,647 B1 * | 11/2004 | Grecco et al. | ............. | 137/552 |

FOREIGN PATENT DOCUMENTS
DE   29607040   7/1996
FR       347910   3/1905

* cited by examiner

*Primary Examiner* — Richard A Smith
(74) *Attorney, Agent, or Firm* — Shoemaker and Mattare

(57) ABSTRACT

A rotary switch comprising a body housing inside itself a rotating shaft operatively connected to a valve or actuator. The switch further comprises a cover, associated to the body by threaded coupling means, provided with an indicator swivelling integrally with the shaft, so that it enables visual signalling of the angular position and/or operating status of the shaft. The switch comprises centering means, mechanically distinct from the threaded coupling means, which ensure the centering of the cover in relation to the body and the coaxial relation between the cover and the rotating shaft.

20 Claims, 4 Drawing Sheets

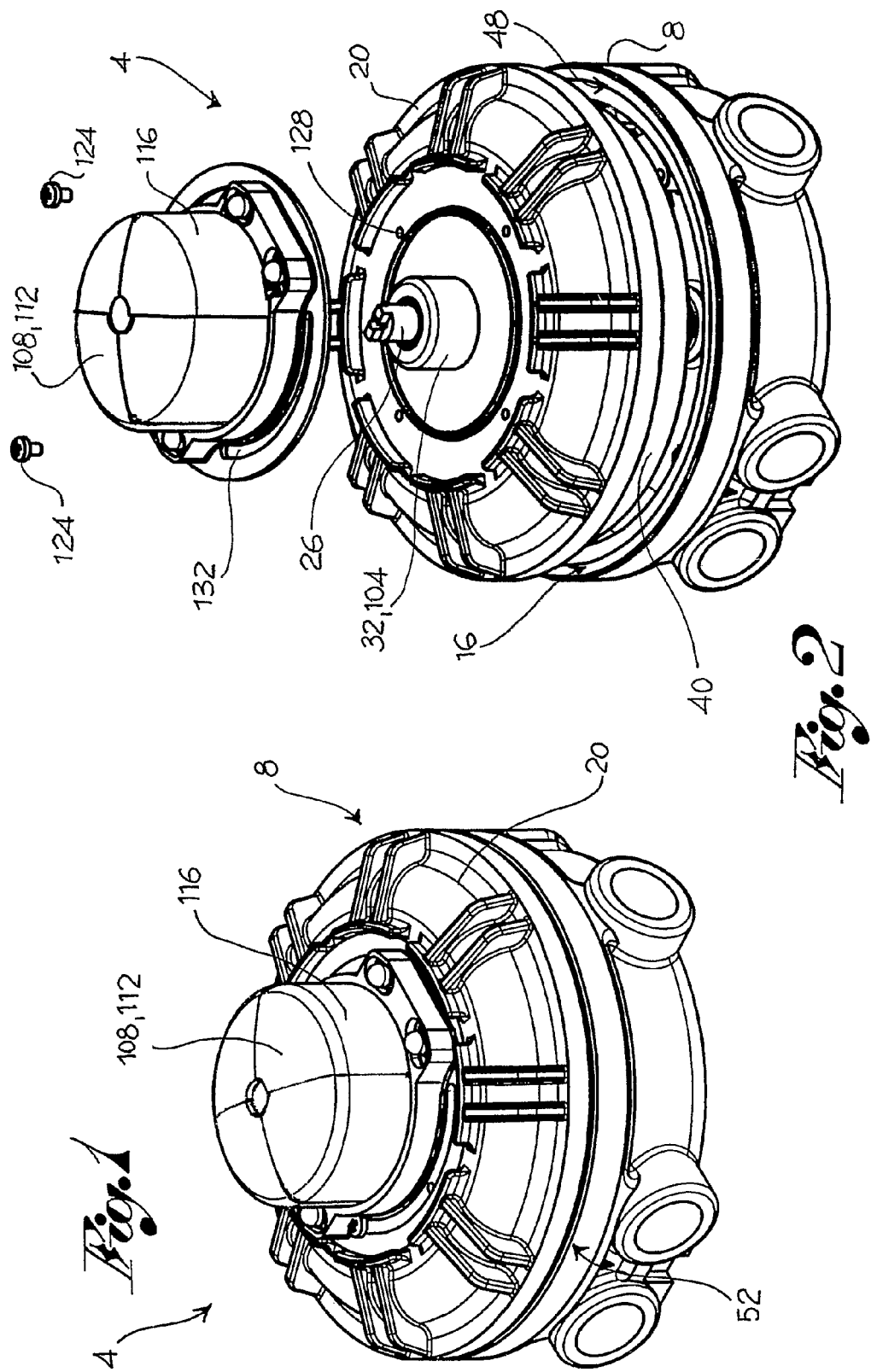

ROTARY SWITCH AND RELATIVE ASSEMBLY METHOD

FIELD OF THE INVENTION

The present invention relates to a rotary switch and specifically to a rotary switch provided with visual signalling means so that it gives a visual indication of the operative functioning status of a valve or actuator operatively connected to the switch.

BACKGROUND OF THE INVENTION

State-of-the-art switches, commonly known as switch boxes, are usually composed by a body and a cover and contain inside them a rotating element or indicator operatively connected to the shaft of the valve or actuator contained in the body.

The stem or rotating shaft is, for example, used in connection with cams operating further devices, such as analogical meter or similar.

The rotating organs are often fitted with visual indicators of the angular position of the valve or actuator shaft, so as to provide a visual indication of the functioning status of the valve or actuator.

Such visual indicators are usually housed on the cover so that they are visible from outside the switch.

For reasons of safety regulations, the switches are preferably made from a body and cover directly screwed onto the body through a threading coaxial with the valve or actuator shaft.

Such state-of-the-art devices have many drawbacks and limitations.

In fact, if the cover is not correctly centred on the body, the rotating shaft, which passes through the inside of the body and is supported in its rotation by the cover, inevitably tends to seize and break.

Furthermore, after the cover has been screwed onto the body, it is not easy to set the visual indicators on the zero position. This is essentially due to the fact that the screwing of the cover onto the body prevents the obtainment of a fixed and repeatable position of the stroke end of the cover.

SUMMARY OF THE INVENTION

The aim of the present invention is to produce a rotary switch which resolves the mentioned drawbacks with reference to the state-of-the-art.

Such problems and limitations may be solved by a rotary switch according to claim 1 and by a method of assembling the switch according to claim 18.

BRIEF DESCRIPTION OF THE DRAWINGS

Other embodiments of the invention are described in the following claims.

Further features and advantages of the present invention will appear more clearly from the following description of preferred embodiments, made by way of an indicative and non-limiting example, wherein:

FIG. 1 shows a perspective view of a switch for a rotary switch, in an assembly configuration according to an embodiment of the present invention;

FIG. 2 shows a perspective view with separated parts of the switch of FIG. 1;

DETAILED DESCRIPTION OF THE INVENTION

Figure 3:
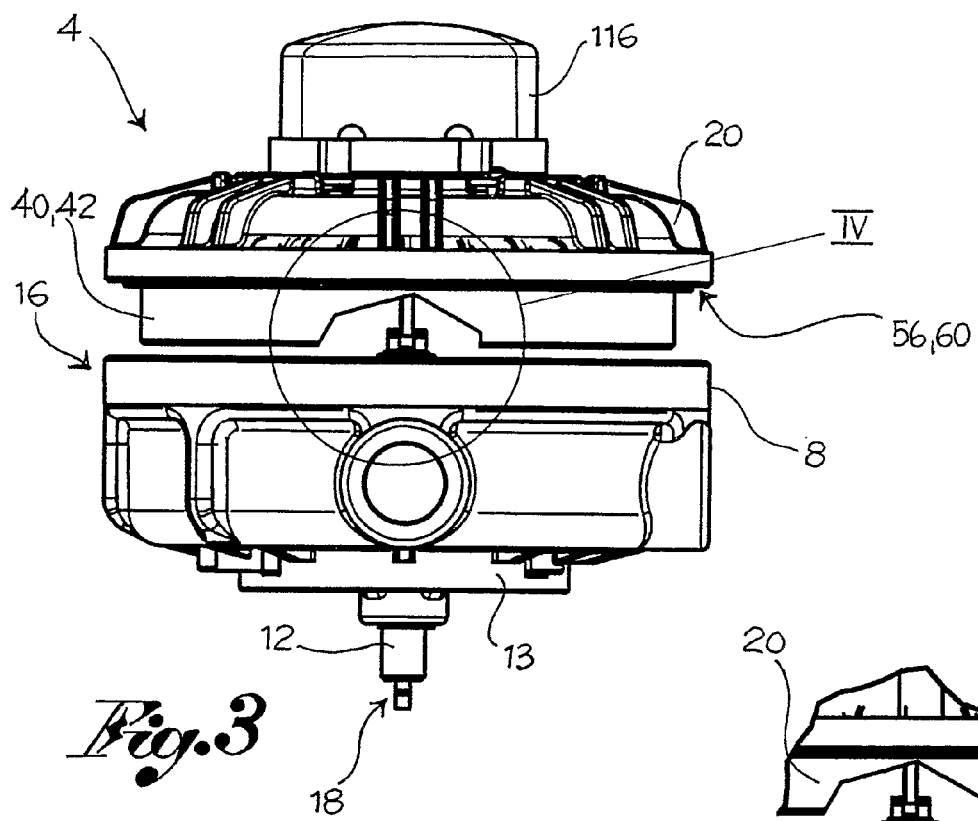
FIG. 3 shows a side view of the switch in FIG. 1.
Figure 4:
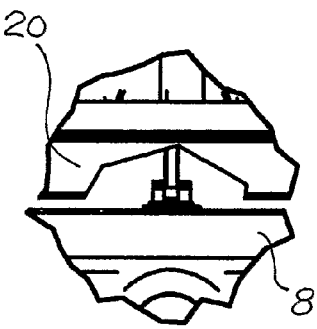
FIG. 4 shows an enlarged cross-section view of the detail IV of FIG. 3.
Figure 5:
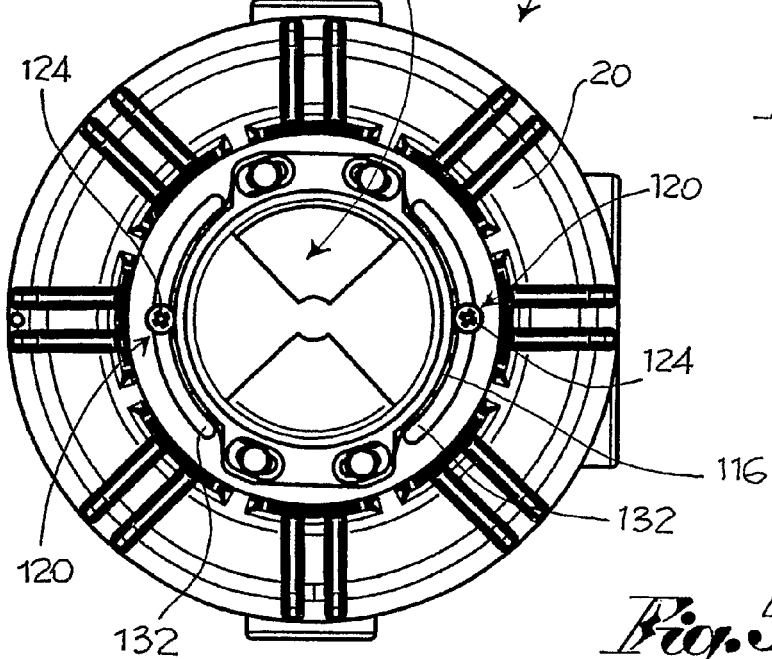
FIG. 5 shows a plant overhead view of the switch of FIG. 1.
Figure 6:
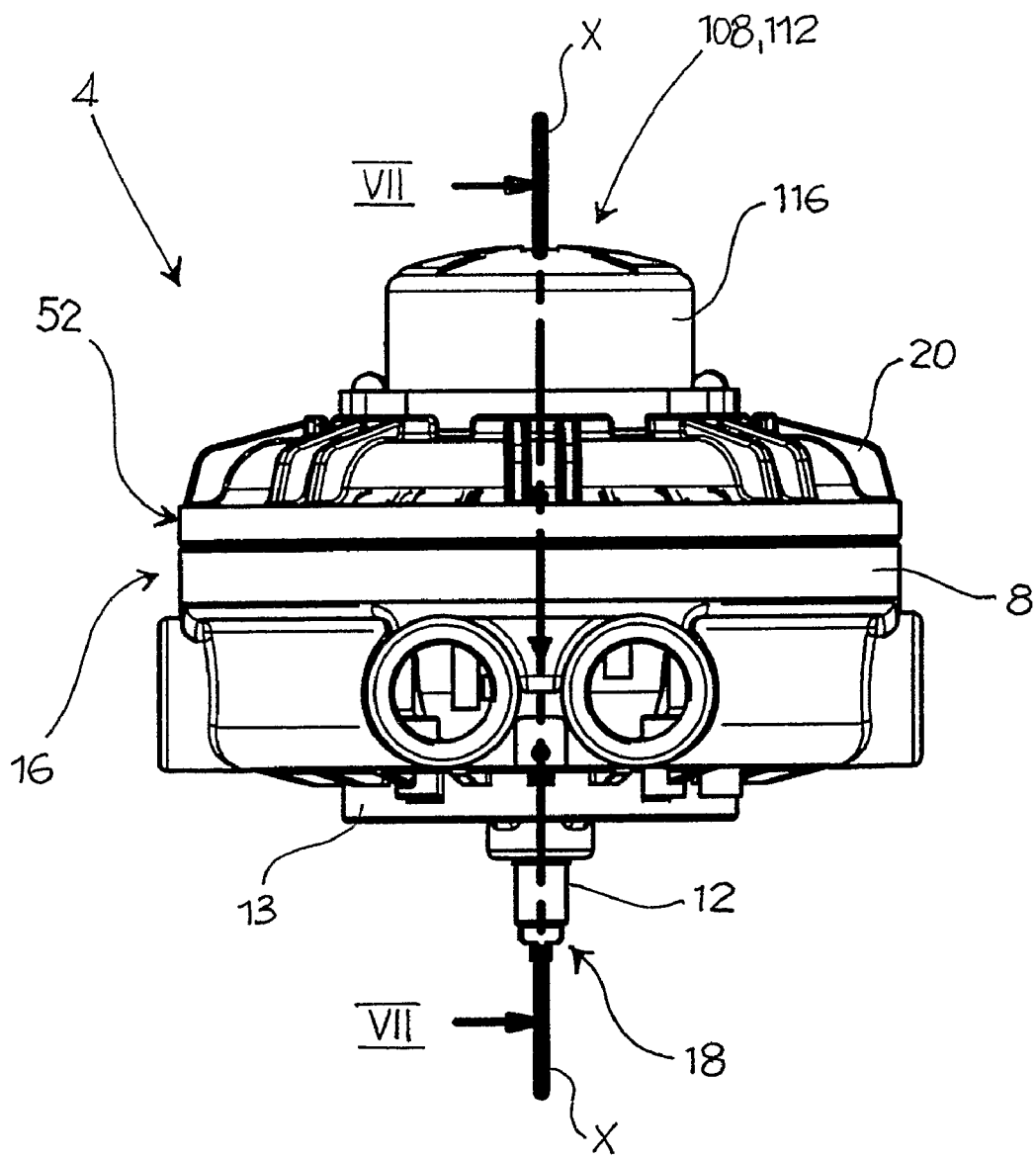
FIG. 6 shows a side view of the switch of FIG. 1.
Figure 7:
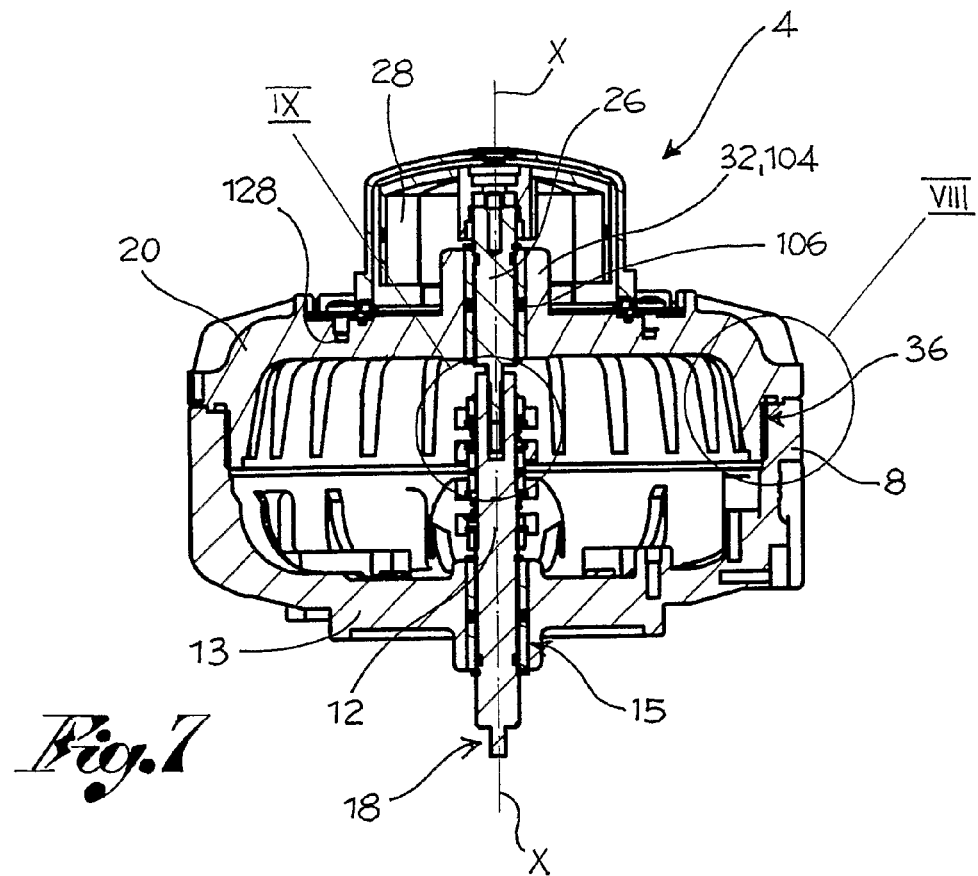
FIG. 7 shows a cross-sectional view of the switch of FIG. 1, along the line VII-VII of FIG. 6.
Figure 9:
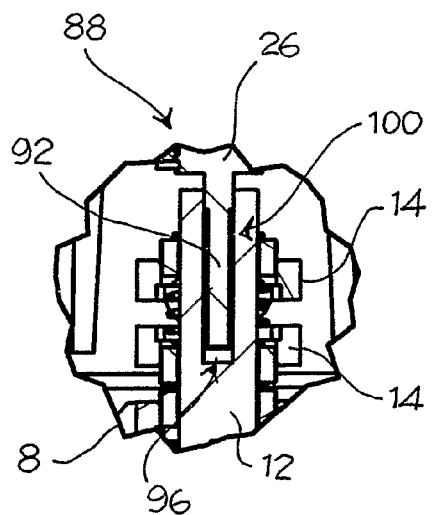
FIG. 9 shows an enlarged cross-sectional view of the detail IX of FIG. 7.
Figure 8:
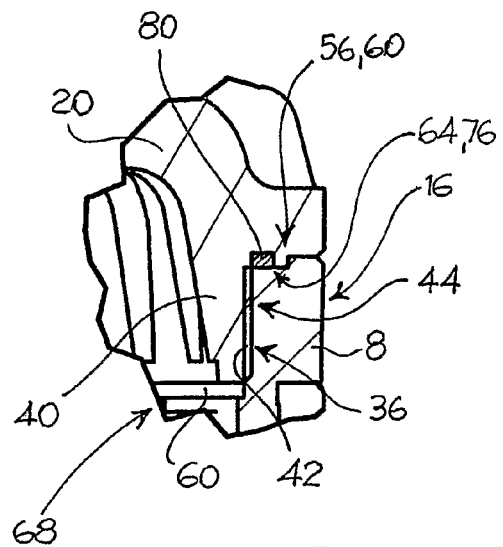
FIG. 8 shows an enlarged cross-sectional view of the detail VIII of FIG. 7.

The elements or parts of elements common to the embodiments described below will be indicated by the same numerical references.

With reference to the above figures, reference numeral 4 globally indicates a rotary switch.

The switch 4 comprises a body 8 which houses in a swivelling mode, a rotating shaft 12 operatively connected to a valve or actuator; the shaft 12 rotates around a rotation axis X-X depending on the functioning of the valve or actuator. The shaft 12, for example, passes through a bottom 13 of the body 8 and is supported in its rotation by a collar 15 coaxial with said rotation axis X-X. Preferably, the shaft 12 is operatively connected to the valve or actuator at a free extremity 18, which protrudes for example from the bottom 13 of the body 8.

Cams 14 can be associated to the shaft 12 to activate further electric signalling devices of switches, inductive sensors, proximity sensors and similar.

In other words, the shaft 12 rotates with the valve or actuator, and by turning performs the function of a switch activating, for example by means of cams, a plurality of devices connected to the switch.

This way, depending on the functioning or operative status of the valve or actuator, the switch 4 can control a number of devices; the phasing between the switch and the valve or actuator is ensured by the shaft 12 which rotates jointly with the valve or actuator.

According to an embodiment, the body 8 comprises a coupling end 16; for example opposite to said bottom 13, preferably levelled so that it forms a striking plane perpendicular to the rotation axis X-X of the shaft 12.

The switch 4 comprises a cover 20, associable to said body 8 at the coupling end 16.

According to an embodiment, the cover 20 is provided with a rotating angular position indicator 28, rotating around said rotation axis X-X; preferably the indicator 28 is associated in rotation to the shaft 12, so that it enables visual signalling of the angular position and/or operating status of the shaft 12.

According to an embodiment, the indicator 28 comprises a stem 26, suitable for being joined in rotation with the shaft 12.

Preferably, the cover 20 comprises a support element 32, such as for example a bushing insert 104, able to support the indicator 28 in rotation. For example, said support element 32 is coaxial to the rotation axis X-X.

The support element 32 can be a bushing insert 104 joined to the cover 20 or made in one piece with the cover 20, for example as a seat of the cover itself.

Advantageously, the cover 20 is screwed onto the body 8 by threaded coupling means 36, said means 36 being coaxial with the shaft 12 and with the axis X-X.

According to an embodiment, the threaded coupling means 36 comprise a socket portion 40 comprising a threaded portion 42, coaxial with the rotation axis X-X, and a nut screw 44, coaxial with the rotation axis X-X and able to engage the threaded portion 42 of the socket portion 40.

According to an embodiment, the socket portion 40 is associated to the cover 20 and the nut screw 44 is associated on an internal side wall 48 of the body 8, at the coupling end 16 facing the associable cover 20.

In other words, the socket portion 40 of the cover has a diameter essentially complementar to the internal diameter of the body 8, at the coupling end 16.

According to a further embodiment, the socket portion 40 with the relative threaded portion 42 is associated to the coupling end 16 of the body 8, while the nut screw 44 is positioned on the relative extremity of the joint 52 of the cover 20.

Advantageously, the switch 4 comprises centering means 56, mechanically distinct from said threaded coupling means 36, which ensure the centering of the cover 20 in relation to the body 8 and the coaxial relation between the cover 20 and the shaft 12.

According to an embodiment, the centering means 56 comprise a flange 60 and relative seat 64 counter-shaped to it, the flange 60 and the seat 64 being coaxial with the rotation axis X-X of the shaft 12.

Preferably, the flange 60 and the seat 64 are cylindrical in relation to the X-X axis. In other words, the flange 60 has a ring-shaped configuration and the seat 64 is a ring-shaped seat.

According to an embodiment, the flange 60 is associated to the cover 20 and the seat 64 is associated to the body 8.

According to an embodiment, the flange 60 is associated to a front extremity 68 of the socket portion 40, so that it forms a mouth and a guide in the engaging of the threaded coupling means 36.

According to a further embodiment, the flange 60 is associated to an external circular crown of the cover 20 and inserted on a circular groove 76 made on the coupling end 16 of the body of the switch 8.

According to a further embodiment, the flange 60 is associated to the coupling end 16 of the body 8 and the groove 76, counter-shaped to the flange 60, associated to the cover 20.

Preferably, sealing means 80 are inserted between the cover 20 and the body 8, such as for example an O-ring gasket.

According to an embodiment, the indicator 28 comprises a stem 26, rotatively supported by the cover 20; said stem 26 having a slot-in portion 88 able to connect in rotation the stem 26 with the shaft 12.

According to a further embodiment, the slot-in portion 88 comprises a protuberance 92 suitable for slotting into a cavity 96 of a fork section 100 of the shaft 12, so that it enables axial sliding between the stem 26 and the shaft 12, ensuring the transmission of rotation between the stem 26 and the shaft 12.

For axial sliding it is meant a translation in a direction parallel to the rotation axis X-X.

Preferably, the protuberance 92 has a blade configuration and slots-into a rectangular cavity 96 able to receive the protuberance 92.

According to an embodiment, the stem 26 is supported in its rotation by the cover 20, for example by means of the interposition of a bushing insert 104, coaxial with the rotation axis X-X; preferably, a seal 106 is inserted between the bushing insert 104 and the stem 26.

Preferably, the cover 20 comprises visual signalling means 108 mechanically disconnected from the indicator 28.

For example, the visual signalling means 108 comprise a mask 112 for the visual indication of the position of the indicator 28, said mask 112 being mechanically distinct from the indicator 28.

For example the mask 112 is joined to a cap 116 of the cover 20.

Preferably, the cap 116 is rotable in relation to the cover 20, around the axis X-X, through adjusting means 120 of the angular position, suitable for enabling continuous regulation of the angular position of the mask 112 in relation to the shaft 12.

According to an embodiment, said adjusting means 120 comprise at least one screw 124 inserted in a relative hole 128 of the cover 20 and a slot 132 intercepted by the screw 124 so as to enable blockage of the cap 116 in the desired angular position.

In other words, the screw 124 is engaged in the hole 128 of the cover 20; the screw 124 intercepts the slot 132 having a width at least equal to the screw body, so to enable sliding between the screw and the slot.

The slot 132 has a width smaller than the head of the screw so that after screwing of the screw into the hole 128 the head abuts on the slot, blocking rotation of the cap 116.

The assembly of a switch according to the invention will now be described.

The assembly method of the rotary switch 4 comprises the steps of positioning the cover 20 coaxially to the body 8 and to the rotation axis X-X of the shaft 12.

A slot-in portion 88 of the stem 26 of the indicator 28 is then inserted into the relative cavity 96 of the shaft 12, so that it secures in rotation the stem 26 with the shaft 12.

The cover 20 is then screwed onto the body 8 maintaining the rotary connection between the indicator and the shaft 12. In fact, while screwing on, the cover 20 comes closer to the coupling end 16 of the body 8 and a slot-in portion 88 penetrates inside the cavity.

After complete screwing on the cover 20, the visual signalling means 108, 112 are zeroed.

Specifically, the cap 116 is released from the cover 20, by loosening the screw 124 as needed, preferably maintaining engagement of the screw 124 in the hole 128 and simultaneously enabling rotation of the cap and of the relative visual signalling means 108, such as, for example, the mask 112, in relation to the rotation axis X-X.

The cap 116 and the mask 112 are directed at an angle in relation to the indicator 28, thanks to a continuous type adjustment. After reaching the desired angular position, the screw 124 is then tightened so as to block the cap 116 in position.

As may be appreciated from the description, the switch according to the invention makes it possible to overcome the state-of-the-art drawbacks.

Specifically, the centering means that the cover and the body are securely and perfectly co-axial to each other; this way the shaft of the valve or actuator and the stem of the indicator of the cover rotate coaxially to each other without risk of seizing.

The shape connection between the indicator and the shaft ensures improved ease of assembly.

In fact, when screwing on the cover, the indicator can be rapidly fitted onto the tip of the shaft; after tightening, the axial depth of the seat of the shaft ensures connection during rotation, gradually when the cover abuts on the coupling extremity of the body.

This way, the cover is assembled to the body rapidly and easily.

Furthermore, after screwing on the cover, it is possible to adjust the angular position of the mask independently of the end stroke of the cover.

Thanks to the presence of slots, the mask can be continuously adjusted so that it ensures zeroing of the visual means.

A man skilled in the art may make numerous modifications and adjustments to the switches described above in order to satisfy contingent and specific requirements, all likewise contained within the sphere of the invention as defined by the following claims.

The invention claimed is:

1. Rotary switch comprising
   a body which houses in a swivelling mode a rotating shaft operatively connected to a valve or actuator, the shaft rotating around a rotation axis,
   a cover, associated to said body, the cover being provided with an indicator swivelling around said rotation axis and associated in rotation to said shaft, so that it enables visual signalling of the angular position and/or operating status of the rotating shaft,
   wherein
   the cover is screwed onto the body by threaded coupling means, said means being coaxial to the shaft,
   the switch comprises centering means, mechanically distinct from said threaded coupling means, which ensure the centering of the cover in relation to the body and the coaxial position of the cover and shaft.

2. Switch according to claim 1, wherein the threaded coupling means comprise a socket portion having a threaded portion, coaxial with the rotation axis, and a nut screw, coaxial with the rotation axis and able to engage with the threaded portion of the socket portion.

3. Switch according to claim 2, wherein said socket portion is associated to the cover and said nut screw is positioned on an internal side wall of the body, facing the associable cover.

4. Switch according to claim 1, wherein the centering means comprise a flange and relevant seat counter-shaped to it, the flange and the seat being coaxial with the rotation axis.

5. Switch according to claim 4, wherein the flange and the seat are cylindrical.

6. Switch according to claim 4, wherein the flange is associated to the cover and the seat is associated to the body.

7. Switch according to claim 4, wherein the flange is associated to the frontal extremity of the socket portion, so that it forms a mouth and a guide for the engagement of the threaded coupling means.

8. Switch according to claim 4, wherein the flange is associated to an external circular crown of the cover and is inserted on a circular groove made on the coupling end of the body of the switch.

9. Switch according to claim 1, wherein sealing means are inserted between the cover and the body.

10. Switch according to claim 1, wherein the indicator comprises a stem, supported in swivelling mode by the cover, and comprising a slot-in portion able to block the rotation of the stem with the shaft of the valve.

11. Switch according to claim 10, wherein said slot-in portion comprises a protuberance suitable for slotting into a cavity of a forked portion of the shaft, so that it enables axial sliding between the stem and the shaft, guaranteeing the transmission of the rotation between the stem and the shaft.

12. Switch according to claim 10, wherein the stem is supported in rotation by the cover, for example by means of the interposition of a bushing insert, coaxial with the rotation axis.

13. Switch according to claim 1, wherein the cover comprises visual signalling means mechanically disconnected from the indicator.

14. Switch according to claim 13, wherein the visual signalling means comprise a mask for the visual indication of the position of the indicator, said mask being mechanically distinct from the indicator.

15. Switch according to claim 13, wherein said mask is integrally associated with a cap of the cover.

16. Switch according to claim 15, comprising the cap swivelling in relation to the cover, around the axis, by adjusting means of the angular position, able to allow a continuous adjustment of the angular position of the mask in relation to the shaft.

17. Switch according to claim 16, wherein said adjusting means comprise at least one screw inserted in a relative hole of the cover and a slot intercepted by the screw so that it enables blocking of the cap in the desired angular position.

18. Method of assembly of a rotary switch according to claim 1, comprising the steps of:
   positioning the cover coaxially to the body and to the rotation axis,
   inserting a slot-in portion of the indicator onto the shaft,
   screwing the cover onto the body maintaining the rotary connection between the indicator and the shaft.

19. Method of assembly of a rotary switch according to claim 18, wherein said slotting—in step between the indicator and the shaft consists in inserting a protuberance of the stem of the shaft into a cavity of the shaft according to a shape coupling allowing relative translation between the protuberance and the cavity, ensuring connection in rotation between the stem and the shaft.

20. Method of assembly of a rotary switch according to claim 18, comprising the steps of:
   releasing the cap from the cover,
   positioning the cap and the mask at an angle to the indicator, according to a continuous type adjustment,
   tightening the cap to the cover.

* * * * *